United States Patent Office 3,535,289
Patented Oct. 20, 1970

3,535,289
EPOXY RESIN COMPOSITION AND ITS PRODUCTION
Fumihiko Kato and Mitsuo Yoshihara, Shimohozumi, Japan, assignors to Nitto Electric Industrial Co., Ltd., Shimohozumi, Ibaraki, Japan
No Drawing. Filed Mar. 10, 1967, Ser. No. 622,071
Claims priority, application Japan, Mar. 12, 1966, 41/15,472
Int. Cl. C08g 17/04, 30/00, 30/12
U.S. Cl. 260—78.4                                6 Claims

ABSTRACT OF THE DISCLOSURE

Epoxy resin composition comprising (1) a linear polymer of B stage which is prepared by reacting one mol of an aliphatic or alicyclic dicarboxylic acid diglycidyl ester with 0.01–1.0 mol of a modifier selected from the group consisting of aliphatic and alicyclic dicarboxylic acids and (2) at least one curing agent selected from the group consisting of (a) aliphatic and alicyclic amines, polycarboxylic acids and their anhydrides and (c) organic metal compounds, when cured are not only arc-resistant but also satisfactorily resistant to severe hot-cold cycled condition.

---

This invention relates to an improved curable epoxy resin composition and its production. More particularly this invention relates to an epoxy resin composition curable to solid state which is tough and is resistant to crack under shock of severe cold and hot conditions, and to the production of such resin composition.

It is well known to employ an epoxy resin as an insulating material. However, conventional epoxy resins are relatively high in carbon content in the molecule so that when they are exposed to arc discharge they are carbonized forming a conductive track or path so that the desired insulative property is lost. It has been proposed to incorporate into an organic insulating material a thermally stable inorganic filler such as quartz, calcium carbonate, etc. or a metal hydroxide such as aluminum hydroxide, magnesium hydroxide, etc. in order to improve the thermal resistivity and thermal conductivity and hence to improve the electrical characteristics such as arc resistance. However these conventional insulating materials have not been fully satisfactory particularly when they are used in casting a complicated article within which a metallic conductor or the like is embedded or when they are used as a coating of such a thin thickness as 1.5–3 mm. on an article, because the cured material is cracked under severe hot-cold cycled condition. The resistance to severe hot-cold cycled condition is determined, for example, by exposing a cured material to +120° C. for 3.5 hours and then immediately to −50° C. for 3.5 hours. By repeating this hot-cold cycle to observe the formation or nonformation of crack on the material, toughness or resistance of the material to hot-cold cycled condition is determined. The resistance to such hot-cold cycled condition is important in various applications of insulating materials, particularly in out-door uses such as brush holder rod for high speed electric car, insulating arm for use in steel tower for electric power transmission.

Therefore, the principal object of this invention is to provide an improved epoxy resin composition which, when cured, is not only arc-resistant but also satisfactorily resistant to severe hot-cold cycled condition.

Briefly, the epoxy resin composition of this invention comprises (1) a linear polymer of B stage which is prepared by reacting one mol of an aliphatic or alicyclic dicarboxylic acid diglycidyl ester with 0.01–1.0 mol of a modifier selected from the group conissting of aliphatic and alicyclic dicarboxylic acids and (2) at least one curing agent selected from the group consisting of (a) aliphatic and alicyclic amines, polycarboxylic acids and their anhydrides and (b) organic metal compounds.

As for aliphatic or alicyclic dicarboxylic acid diglycidyl esters in this invention, diglycidyl ester of those carboxylic acids not containing C—C unsaturation in the molecule. Examples of such aliphatic and alicyclic carboxylic acids having no carbon-carbon unsaturation in the molecule are succinic acid, glutaric acid, adipic acid, pimelic acid, sebacic acid, hexahydrophthalic acid, hexahydroisophthalic acid, hexahydroterephthalic acid, etc. The diglycidyl esters of these dicarboxylic acids may be prepared by a suitable manner known per se. Thus, for example, epichlorohydrine is reacted with an alkali metal salt of the dicarboxylic acid in the presence of a catalyst such as a quarternary ammonium salt or an alkali metal halide (e.g. KBr, KI, NaBr, NaI, etc.) to produce the corresponding carboxylic acid diglycidyl ester having two epoxy groups in the molecule.

One of the important features of this invention is to employ a modifier selected from the group consisting of aliphatic and alicyclic dicarboxylic acids. The modifier is employed to partly ring-open the above mentioned diglycidyl so that a linear polymer may be produced. Therefore polycarboxylic acids such as tri- or tetra-carboxylic acids can not be used because they would not form a linear polymer. Further, even if dicarboxylic acids, their anhydrides are not preferable because they would form a cross-linked structure.

In the formation of a linear polymer, the modifier is slowly added to react with the diglycidyl ester. The amount of the modifier should be 0.01–1.0 mol per mol of the glycidyl ester. When the modifier is less than 0.01 mol per mol of the glycidyl no improvement in the resistance to hot-cold cycled condition can be expected. On the contrary, if the amount of the modifier exceeds 1 mol the resulting resin tends to form undesirable three-dimensional structure.

The viscosity and amount of residual epoxy ogygen of the resulting linear polymer may be suitably controlled by varying the relative amounts of the reactants and their kinds.

According to the invention, a proper and particular curing agent must be incorporated in the above prepared linear polymer. The curing agent should not be those which will unduly increase the carbon content in the resulting resin composition. Therefore, it is preferable to employ those which have less or no carbon-carbon unsaturation in the molecule. Such curing agents are selected from aliphatic and alicyclic amines, polycarboxylic acids and their anhydrides. Examples of them are amines such as diethylenediamine, hexamethylenediamine, diethylenetriamine, hexamethylenetetramine, cyclohexylamino propylamine, monoethanolamine, propanolamine, cyclohexanediamine, cyclohexanetriamine. Examples of preferable carboxylic acids are adipic acid, sebacic acid, hexahydrophthalic acid, hexahydroisophthalic acid, hexahydroterephthalic acid, hexahydropyromellitic acid, cyclopentanetetracarboxylic acid, etc. Anhydrides of these acids are also useful.

Also useful as curing agents in this invention are organo-metallic compounds such as boron trifluoride amine complexes, trialkanolamine borate. These are potential or latent curing agents. Particular examples of these compounds are boron trifluoride monoethylamine complex, triethanolamine borate, etc.

Further, tertiary amines such as triethylamine, piperidine, benzyldimethyl amine, etc., which are known as curing catalysts for epoxy resins may also be used alone or together with other curing agents.

The curing agent may be used in an amount in a wide range. However, it is preferable to use the curing agent in an amount of 0.5–3 equivalents per one epoxide equivalent in the linear epoxy polymer.

The essential components of the composition of this application are the particular linear epoxy polymer explained hereinbefore and the particular curing agent just described above. However, it is also possible to incorporate into the composition any one or more of conventional metal hydroxides and other inorganic fibers, flame retardants and inorganic pigments.

Examples of inorganic fillers are aluminum hydroxide, magnesium hydroxide, barium hydroxide, silica, aluminium oxide, titanium oxide, cobalt oxide, zirconium oxide, barium sulfate, calcium carbonate, clay, kaolin clay, slate powder, mica powder, asbestos, etc. The inorganic filler may be added in an amount of about 10–75% by weight based upon the epoxy polymer.

As flame retardants, antimony trioxide, borax, etc. may be used. It may be used in an amount of 1–35% by weight of the epoxy resin.

Examples of inorganic pigments useful in this invention are ferric oxide, chrome yellow, procion blue, titanium dioxide, colored titanium pigment, titanates such as barium titanate, zinc titanate, lead titanate, magnesium titanate, etc. Since a larger amount of these pigments tends to reduce the arc-resistance of the cured material, the use of the same should be less than 1% by weight based upon the epoxy polymer.

Depending upon the particular use of the composition, it is necessary to dilute the same into a proper viscosity. For this purpose any inert solvent for the epoxy resin may be used. However, it is preferable to use a reactive diluent. Examples of useful reactive diluents are 1,4-butanediol diglycidyl ether, diethyleneglycol diglycidyl ether, triethyleneglycol diglycidyl ether, polyethyleneglycol diglycidyl ether.

If the arc-resistance of the resulting material may not fully be utilized, a small amount of conventional thermosetting resins such as conventional epoxy resins, phenol resins, etc. may be added to the composition of this invention, or a small amount of compounds having one one carbon-carbon unsaturation in the molecule, e.g. tetrahydrophthalic acid diglycidyl ester, tetrahydrophthalic acid may be employed in the formation of the composition of this invention.

The composition of this invention may be used in various insulative applications. Thus, the composition may be shaped into articles, applied as insulating coating or as impregnation material in a conventional manner. Thus, for example, the composition can be used as a material for forming (by means of casting, pouring etc.) into insulating arms, insulating bolts, mist proof insulators, arc chuters, magnet switches, fuse boxes, fuse pipe ducts, etc. which will be exposed to arc under high voltage. The composition may also be used for surface coating and also as an impregnation material for the production of reinforced plastics, laminates, etc.

The thus applied material may be cured in a manner well known to the art of curing epoxy resin or its articles.

Since the various components of the composition of this invention are substantially free from carbon-carbon unsaturation, the resulting cured material would prevent the undue formation of free and conductive carbon black on the surface when exposed to arc discharge, it is highly resistant to arc and tracking. Further, the main component (epoxy polymer) is a linear polymer the resulting material is resistant to severe hot-cold cycled shock.

This invention will be described in more detail by referring to the following examples. However, it should be understood that these examples are given for illustrative purpose only and not for limiting the scope of the invention in any way.

EXAMPLE 1

In a three-necked flask (volume 1 liter) fitted with a thermometer and agitator there were charged 2840 g. (10 mol) of diglycidylhexahydrophthalate. While stirring at 120 C. there were slowly (over about 30 minutes) added 172 g. (1 mol) of hexahydrophthalic acid. The mixture was stirred at that temperature for further one hour until the acid value became zero to obtain a linear polymer. The resulting material was a transparent viscous polymer having a viscosity of 27–30 poises (25° C.), oxirane oxygen (percent) 7.9 and residual epoxy groups 70%.

To 100 g. of the above polymer there were added 75 g. of hexahydrophthalic anhydride, 0.1 g. of benzyldimethylamine, 46 g. of aluminum hydroxide and 7.5 g. of 1,4-butanediol diglycidyl ether to prepare a casting resin composition.

The resin composition was cast in thickness of 3 mm. around a brush holder rod and cured at 110° C. for 1 hour, at 130° C. for 2 hours and finally at 150° C. for 5 hours. For testing, the resulting brush holder rod was heated at 120° C. for 3.5 hours and then immediately cooled to −55° C. for 3.5 hours. This hot-cold cycle was repeated. No crack formation was observed even after 50 cycles or more. The arc-resistance as determined under JIS–K–6911 was more than 7 minutes, and tracking resistance as determined by IEC method (International Electrotechnical Committee, Publication No. 112, 1959) was higher than 700 v.

EXAMPLE 2

In the same manner as in Example 1, 284 g. (1 mol) of diglycidyl hexahydrophthalate and 34.4 g. (0.2 mol) of hexahydrophthalic acid were reacted together until the acid value became zero to obtain a viscous linear polymer having a viscosity of 140 poises (25° C.), oxirane oxygen (percent) 5.0 and residual epoxy groups 52%.

To 100 g. of this linear polymer there were added 50 g. of aluminum hydroxide and 4 g. of boron trifluoride ethyl amine complex and the mixture was cured in the same manner as in Example 1. The resulting solid mass showed excellent arc-resistance and tracking resistance comparable with those of Example 1. The solid mass was also excellent in toughness and its impact strength (JIS–K–6911 Charpy) was 13 kg.-cm./cm.$^2$.

The same procedure was repeated except that the proportions of diglycidyl hexahydrophthalate (referred to as DGH) and hexahydrophthalic acid (referred to as HHP) were varied. The results are as shown in Table I.

TABLE I

| No. | Components g. (mol) | | Linear polymer | | |
| --- | --- | --- | --- | --- | --- |
| | DGH | HHP | Oxirane oxygen, percent | Residual epoxy groups, percent | Viscosity poise, 25° C. |
| 1 | 284 (1.0) | 10.2 (0.06) | 8.9 | 80 | 8 |
| 2 | 284 (1.0) | 28.4 (0.15) | 6.7 | 60 | 100 |

EXAMPLE 3

2840 g. (10 mol) of diglycidyl hexahydroterephthalate and 219 g. (1.5 mol) of adipic acid were charged in the flask same as in Example 1 and were reacted together at 120° C. for 4 hours until the acid value became zero. The resulting linear polymer had a viscosity of 15 poises (25° C.), oxirane oxygen (percent) 6.2 and residual epoxy groups 65%.

To 100 g. of this resin were added 60 g. of hexahydroterephthalic acid and 0.1 g. of benzylmethylamine, and the mixture was cured into solid mass, which showed arc-resistance and cracking-resistance similar to those in Example 1 and further showed improved flexibility and thoroughness.

EXAMPLE 4

258 g. (1 mol) of diglycidyl adipate and 8.6 g. (0.05 mol) of hexahydroterephthalic acid were reacted in a flask similar to that of Example 1 at 80° C. for 10 hours until the acid value became zero. The resulting linear polymer had a viscosity of 14 poises (25° C.), oxirane oxygen (percent) 7.8 and residual epoxy groups 70%.

To 100 g. of this linear resin were added 15 g. of hexamethylenetetramine and 35 g. of aluminium hydroxide, and the mixture was cured at 40–45° C. for 15 hours. The resulting solid mass had an impact strength of 15 kg.-cm./cm.$^2$ and had arc-resistance, tracking resistance and resistance to hot-cold cycled shock comparable with those in Example 1.

EXAMPLE 5

284 g. (1 mol) of diglycidyl hexahydrophthalate and 86 g. (0.5 mol) of hexahydrophthalic acid were reacted together at 85° C. for 15 hours until the acid value became zero. The resulting linear polymer had a melting point of 40–50° C., oxirane oxygen (percent) 5.4 and residual epoxy groups 48%.

To 100 g. of this highly viscous linear resin were added 40 g. of hexahydrophthalic anhydride, 90 g. of aluminum hydroxide and 0.5 g. of benzylamine. The mixture was blended by a roll-mill and shaped under a pressure of 10–15 kg./cm.$^2$ and at 139–140° C. for 30 minutes. The resulting solid showed improved arc-resistance, tracking-resistance and resistance to hot-cold cycled shock comparable with those in Example 1.

EXAMPLE 6

284 g. (1 mol) of diglycidyl hexahydrophthalate and 172 g. (1 mol) of hexahydrophthalic acid were charged in a flask similar to that of Example 1 and reacted together at 100° C. for 6 hours while stirring. Thus there was obtained a linear polymer having terminal epoxy or carboxyl group, a melting point of 110–125° C., oxirane oxygen (percent) 0.5 and residual epoxy groups 4%. This polymer was a fusible and soluble solid.

100 g. of this solid resin were crushed into powder, which was then mixed with 5 g. of cyclopentanetetracarboxylic dianhydride. The mixture was cast in a thickness of 3 mm. around a brush holder rod and cured in the same manner in Example 1. The cured coating layer was flexible and tough, and no crack was observed even under 60 cycles of the hot-cold cycled shock, its arc-resistance was 300 seconds and tracking-resistance was higher than 700 v.

As for aliphatic and alicyclic dicarboxylic acids to be used as modifiers for the epoxy resins, those acids enumerated before in connection with the diglycidyl esters may equally be used.

What we claim is:

1. A curable epoxy resin composition curable to a solid state high in arc-resistance and crack-resistance to severe hot-cold cycled conditions which comprises as essential components (1) a linear epoxy polymer having at least at one end a residual epoxy group and which is a reaction product between (a) a compound selected from the group consisting of aliphatic and alicyclic dicarboxylic acid diglycidyl esters and (b) a modifier selected from the group consisting of aliphatic dicarboxylic acids, the said aliphatic and alicyclic dicarboxylic acids of (1)(a) and the said aliphatic and alicyclic dicarboxylic acids of (1)(b) being substantially free from carbon-carbon unsaturation, the compound (a) being partly ring-opened by the reaction to form the linear polymer, the modifier being 0.1–1.0 mol per mol of the diglycidyl ester, and (2) at least one curing agent selected from the group consisting of (a) aliphatic and alicyclic amines, polycarboxylic acids and their anhydrides and (b) organic metal compounds, said curing agents all being substantially free from carbon-carbon unsaturation, the reaction between compound (a) and modifier (b) being conducted at a temperature of from about 80° C. to about 120° C.

2. A composition as claimed in claim 1 wherein the aliphatic and alicyclic dicarboxylic acids of (1)(a) and (1)(b) are succinic acid, glutaric acid, adipic acid, pimelic acid, sebacic acid, hexahydrophthalic acid, hexahydroisophthalic acid and hexahydroterephthalic acid.

3. A composition as claimed in claim 1 wherein the amines of (2)(a) are diethylenediamine, hexamethylenediamine, diethylenetriamine, hexamethylenetetramine, cyclohexylaminopropylamine, monoethanolamine, propanolamine, cyclohexanediamine and cyclohexanetriamine.

4. A composition as claimed in claim 1 wherein the polycarboxylic acids of (2)(a) are adipic acid, sebacic acid, hexahydrophthalic acid, hexahydroisophthalic acid, hexahydroterephthalic acid, hexahydropyromellitic acid and cyclopentanetetracarboxylic acid.

5. A composition as claimed in claim 1 wherein the organic metal compounds of (2)(b) are boron trifluoride amine complexes and trialkanolamine borates.

6. A composition as claimed in claim 1 wherein the curing agent is used in an amount of 0.5–3 equivalents per epoxide equivalent in the linear epoxy polymer.

References Cited

UNITED STATES PATENTS

| | | | |
|---|---|---|---|
| 3,373,221 | 3/1968 | May | 260—78.4 XR |
| 3,281,376 | 10/1966 | Proops. | |
| 3,296,202 | 1/1967 | Schmitz-Josten et al. | |
| 3,310,503 | 3/1967 | Huwyler. | |

JOSEPH L. SCHOFER, Primary Examiner

J. KIGHT III, Assistant Examiner

U.S. Cl. X.R.

117—232; 252—63.2, 63.5; 260—332